(12) United States Patent
Uhr et al.

(10) Patent No.: US 11,366,803 B2
(45) Date of Patent: Jun. 21, 2022

(54) METHOD FOR PROVIDING RELATIONAL DECENTRALIZED IDENTIFIER SERVICE AND BLOCKCHAIN NODE USING THE SAME

(71) Applicant: COINPLUG, INC., Gyeonggi-do (KR)

(72) Inventors: Joon Sun Uhr, Seongnam-si (KR); Joo Han Song, Seongnam-si (KR)

(73) Assignee: COINPLUG, INC., Gyeonggi-Do (KR)

( * ) Notice: Subject to any disclaimer, the term of this patent is extended or adjusted under 35 U.S.C. 154(b) by 0 days.

(21) Appl. No.: 16/925,528

(22) Filed: Jul. 10, 2020

(65) Prior Publication Data
US 2021/0011905 A1 Jan. 14, 2021

(30) Foreign Application Priority Data

Jul. 11, 2019 (KR) .................. 10-2019-0084088
Jun. 22, 2020 (KR) .................. 10-2020-0076079

(51) Int. Cl.
| | | |
|---|---|---|
| G06F 16/23 | (2019.01) | |
| G06F 16/28 | (2019.01) | |
| H04L 9/06 | (2006.01) | |
| H04L 9/30 | (2006.01) | |

(52) U.S. Cl.
CPC ........ *G06F 16/2379* (2019.01); *G06F 16/288* (2019.01); *H04L 9/0637* (2013.01); *H04L 9/30* (2013.01); *H04L 2209/38* (2013.01)

(58) Field of Classification Search
CPC . G06F 16/2379; G06F 16/288; H04L 9/0637; H04L 9/30; H04L 2209/38; H04L 63/12; H04L 9/3239
See application file for complete search history.

(56) References Cited

U.S. PATENT DOCUMENTS

| | | | |
|---|---|---|---|
| 2019/0164156 A1 | 5/2019 | Lindemann | |
| 2019/0230092 A1* | 7/2019 | Patel | ............... H04L 9/0869 |
| 2020/0127845 A1* | 4/2020 | Yang | ............... G06Q 20/3829 |

FOREIGN PATENT DOCUMENTS

JP 2018-160073 A 10/2018

\* cited by examiner

*Primary Examiner* — Mark D Featherstone
*Assistant Examiner* — Samuel C Sharpless, III
(74) *Attorney, Agent, or Firm* — Gearhart Law LLC; David Postolski, Esq.

(57) ABSTRACT

A method for providing a relational DID (decentralized identifier) service is provided. The method includes steps of: if a specific entity's device broadcasts to a blockchain network a request for registration of relational information which represents a relation between a specific entity's DID and another entity's DID and is set by another entity and confirmed by a specific entity, a blockchain node in the blockchain network (i) verifying the request and registering the relational information in the blockchain network as corresponding to the specific entity's DID and said another entity's DID or (ii) transmitting the request to an identity contract registered in the blockchain network, to allow the identity contract to verify the request and to register the relational information in the blockchain network as corresponding to the specific entity's DID and said another entity's DID.

14 Claims, 5 Drawing Sheets

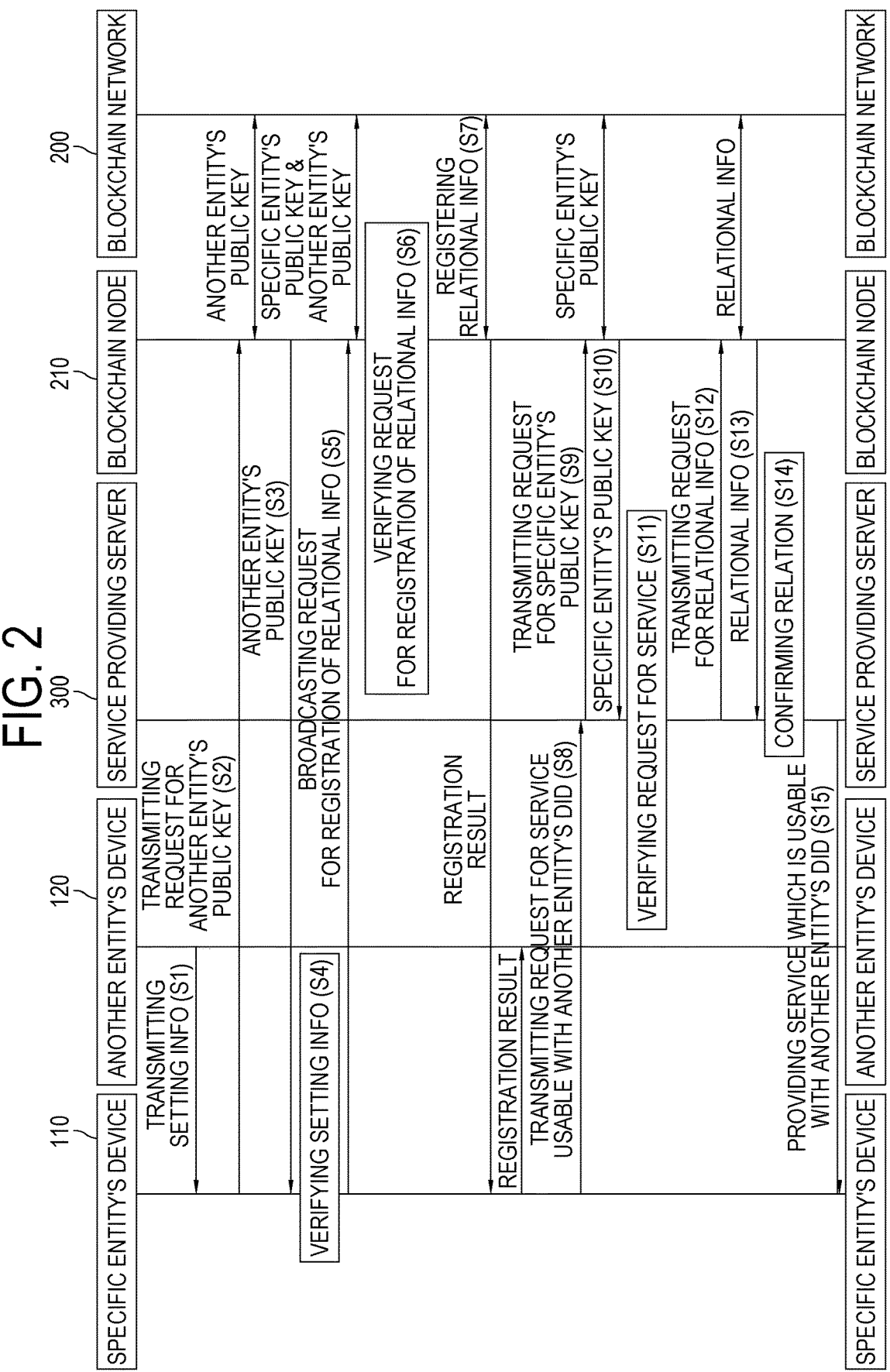

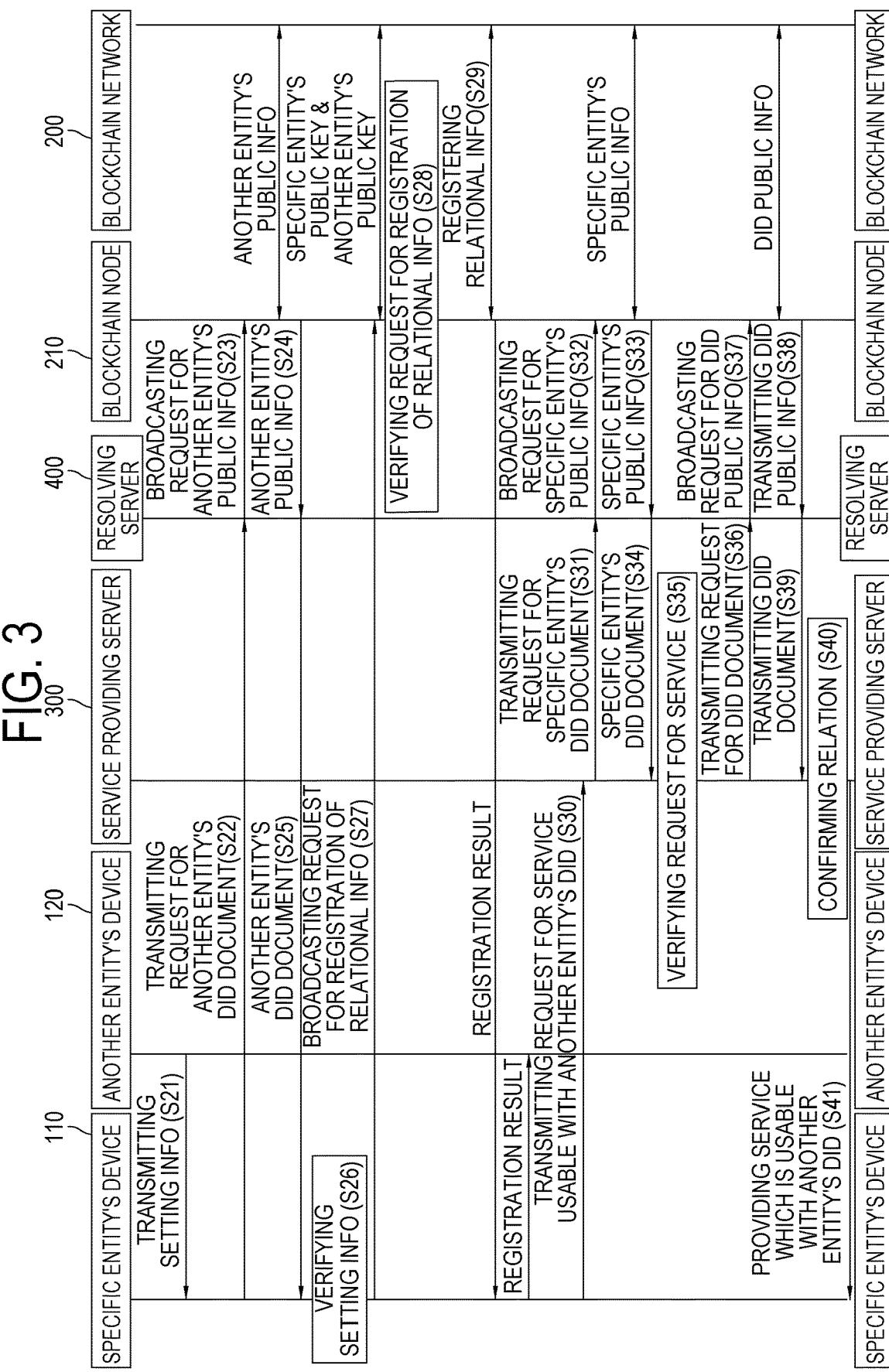

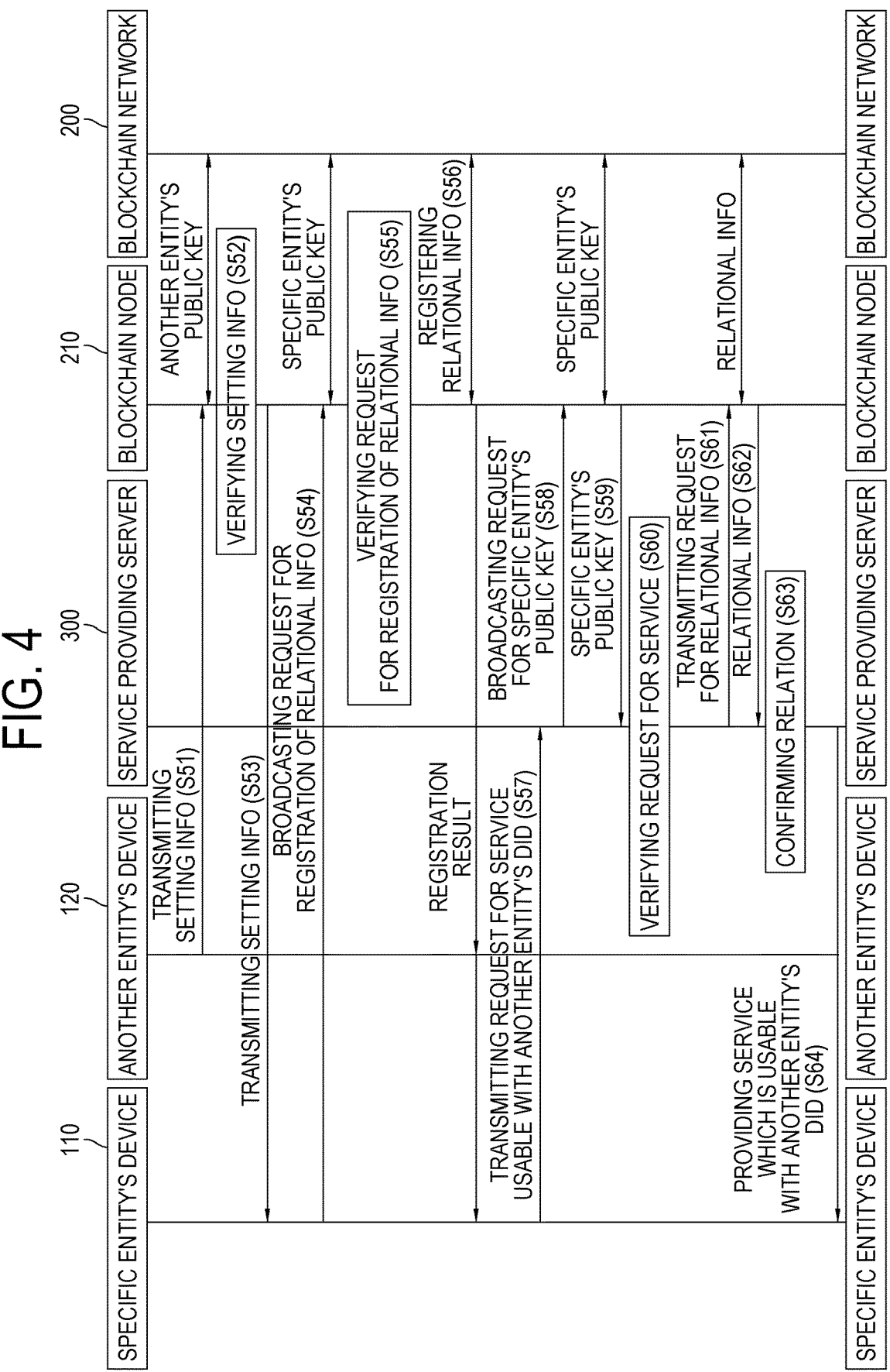

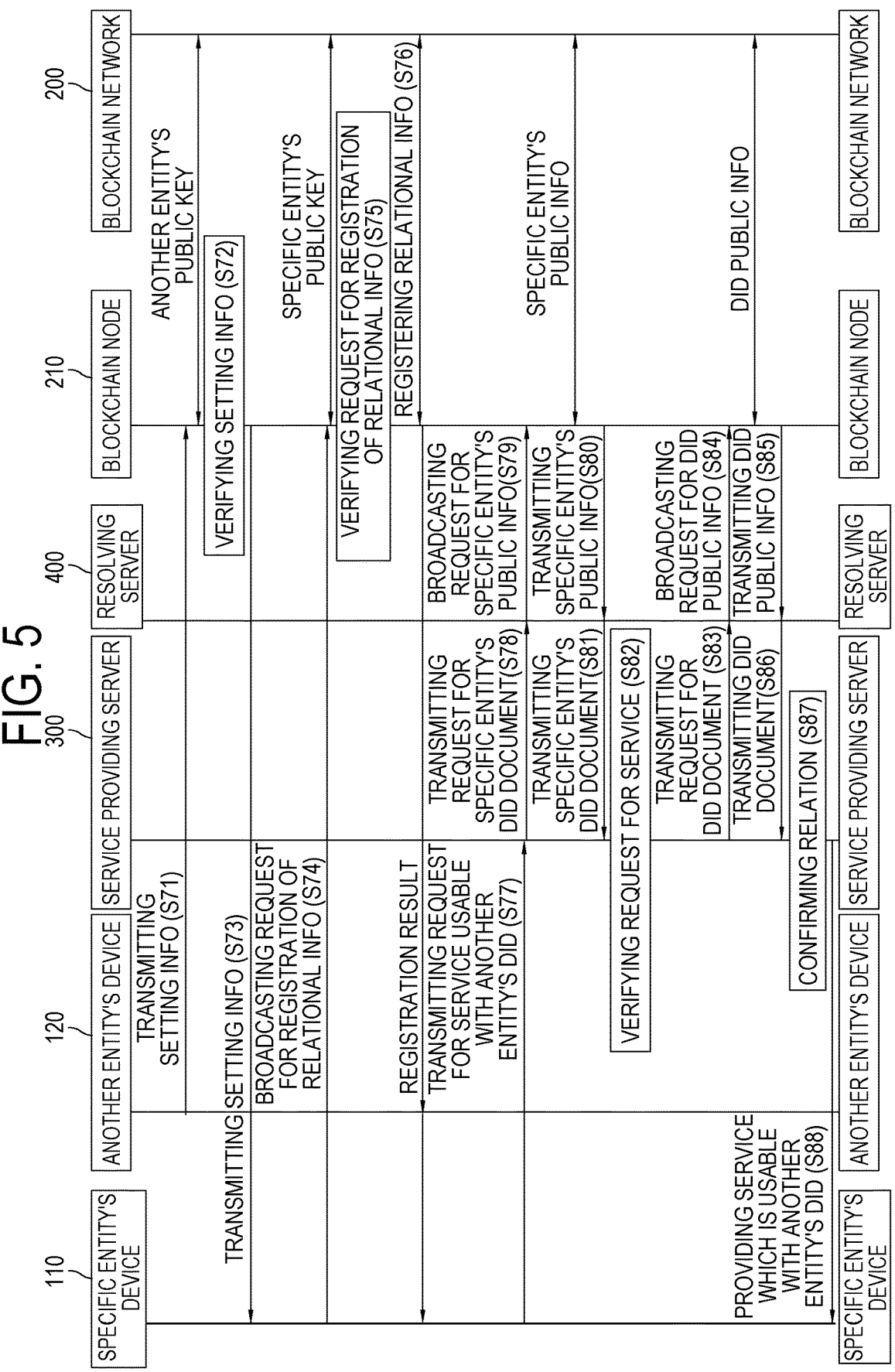

METHOD FOR PROVIDING RELATIONAL DECENTRALIZED IDENTIFIER SERVICE AND BLOCKCHAIN NODE USING THE SAME

CROSS REFERENCE TO RELATED APPLICATION

This application claims priority to Korean Application No. 10-2020-0076079, filed Jun. 22, 2020, which claims priority to Korean Provisional Application No. 10-2019-0084088, filed Jul. 11, 2019, both disclosures which are incorporated herein by reference.

FIELD OF THE DISCLOSURE

The present disclosure relates to a method for providing a relational decentralized identifier service and a blockchain node using the same; and more particularly, to the method for providing the relational decentralized identifier service by referring to relations among entities and the blockchain node using the same.

BACKGROUND OF THE DISCLOSURE

In general, an ID is mapped onto personal information unique to an individual.

For example, an email address aaa@gmail.com is a Google ID, and this ID is mapped onto the personal information such as its user's name, phone number, etc., and stored in the Google user database.

However, due to its centralized nature of the conventional IDs, leakage of the personal information caused by server hacking is frequent. Further, companies do not compensate their users for the collected personal information and its usage.

As a solution for such a conventional centralized management system, decentralized identifiers (DIDs) have been developed as a self-sovereign identity management technology.

For example, a DID such as did:meta:xxx is mapped onto personal information (PI) of an individual and stored in a user device, and the PI is verified by a third party, such as a certificate authority, then the PI is mapped onto the DID as a verifiable credential (VC) and stored in the user device or a VC repository, for example, an identity hub which is a public storage.

Although each entity who/which uses the DID can prove itself by using the DID and the VC, it cannot prove its relations with other entities even when using the DID as such.

SUMMARY OF THE DISCLOSURE

It is an object of the present disclosure to solve all the aforementioned problems.

It is another object of the present disclosure to prove relations among entities.

It is still another object of the present disclosure to provide various services using the relations among the entities.

In accordance with one aspect of the present disclosure, there is provided a method for providing a relational DID (decentralized identifier) service, including steps of: (a) if a request for registration of relational information is broadcast from a specific entity's device to a blockchain network, wherein the relational information represents information on a relation between a specific entity's DID of a specific entity and another entity's DID of another entity and wherein the relational information is set by said another entity and confirmed by the specific entity, a blockchain node in the blockchain network performing or supporting another device to perform one of (i) a process of verifying the request for the registration of the relational information and (ii) a process of transmitting the request for the registration of the relational information to an identity contract registered in the blockchain network, to thereby allow the identity contract to verify the request for the registration of the relational information; and (b) the blockchain node performing or supporting another device to perform one of (i) a process of registering the relational information in the blockchain network as corresponding to the specific entity's DID and said another entity's DID if the request for the registration of the relational information is determined as verified by the blockchain node, and (ii) a process of allowing the identity contract to register the relational information in the blockchain network as corresponding to the specific entity's DID and said another entity's DID if the request for the registration of the relational information is determined as verified by the identity contract.

As one example, the method further includes a step of: (c) if a request for the relational information is acquired from a service providing server in response to a request for a service transmitted from the specific entity's device wherein the service is accessible with said another entity's DID or if a request for DID public information is acquired from a resolving server in response to a request for a DID document from the service providing server, wherein the request for the DID document is at least one of a request for a specific entity's DID document and a request for another entity's DID document, wherein the DID public information includes at least one of specific entity's public information and another entity's public information, wherein the specific entity's public information is registered in the blockchain network as corresponding to the specific entity's DID and includes the relational information and a specific entity's public key corresponding to the specific entity's DID, and wherein said another entity's public information is registered in the blockchain network as corresponding to said another entity's DID and includes the relational information and another entity's public key corresponding to said another entity's DID, the blockchain node performing or supporting another device to perform (1) one of (i) in response to the request for the relational information from the service providing server, (i-1) a process of acquiring the relational information from the blockchain network by referring to the specific entity's DID or said another entity's DID or a process of allowing the identity contract to acquire the relational information from the blockchain network by referring to the specific entity's DID or said another entity's DID, and (i-2) a process of transmitting the relational information to the service providing server, and (ii) in response to the request for the DID public information from the resolving server, (ii-1) a process of acquiring the DID public information from the blockchain network by referring to at least one of the specific entity's DID and said another entity's DID or a process of allowing the identity contract to acquire the DID public information from the blockchain network by referring to at least one of the specific entity's DID and said another entity's DID, and (ii-2) a process of allowing the resolving server to modify the DID public information into the DID document and thus to transmit the DID document to the service providing server, and as a result, (2) a process of allowing the service providing server to (i) confirm a relation between the specific entity's DID and said another entity's DID by referring to one of the relational information acquired from the blockchain node and the relational information acquired from the DID document, and (ii) if the relation between the specific entity's DID and said another entity's DID is confirmed by using the relational information, provide the service corresponding to said another entity's DID to the specific entity's device.

As one example, the request for the service transmitted from the specific entity's device includes a specific entity's signature value created by encrypting the request for the service with a specific entity's private key corresponding to the specific entity's DID, and wherein, if a request for the specific entity's public key corresponding to the specific entity's DID is acquired from the service providing server or if a request for the specific entity's public information is acquired from the resolving server in response to the request for the specific entity's DID document from the service providing server, the blockchain node performs or supports another device to perform (1) one of (i) in response to the request for the specific entity's public key from the service providing server, (i-1) a process of acquiring the specific entity's public key corresponding to the specific entity's DID from the blockchain network by referring to the specific entity's DID or a process of allowing the identity contract to acquire the specific entity's public key from the blockchain network by referring to the specific entity's DID, and (i-2) a process of transmitting the specific entity's public key to the service providing server and (ii) in response to the request for the specific entity's public information from the resolving server, (ii-1) a process of acquiring the specific entity's public information from the blockchain network by referring to the specific entity's DID or a process of allowing the identity contract to acquire the specific entity's public information from the blockchain network by referring to the specific entity's DID, and (ii-2) a process of allowing the resolving server to modify the specific entity's public information into the specific entity's DID document and thus to transmit the specific entity's DID document to the service providing server, and as a result, (2) a process of allowing the service providing server to (i) verify the specific entity's signature value by decrypting the specific entity's signature value with the specific entity's public key acquired from the blockchain node or from the specific entity's DID document, and (ii) if the specific entity's signature value is determined as verified, broadcast the request for the relational information to the blockchain network.

As one example, at the step of (a), the request for the registration of the relational information includes setting information and confirmation information, wherein another entity's device corresponding to said another entity's DID creates the setting information by setting a relation between the specific entity's DID and said another entity's DID and wherein the specific entity's device creates the confirmation information by confirming the relation between the specific entity's DID and said another entity's DID.

As one example, the setting information includes (1) the relational information representing a relation between the specific entity's DID and said another entity's DID, and (2) another entity's signature value created by encrypting the relational information with another entity's private key corresponding to said another entity's DID, and wherein the confirmation information includes (1) the relational information and (2) a specific entity's signature value created by encrypting the relational information with a specific entity's private key corresponding to the specific entity's DID, and wherein the blockchain node performs or supports another device to perform (i) (i-1) a process of acquiring a specific entity's public key corresponding to the specific entity's DID and another entity's public key corresponding to said another entity's DID from the blockchain network by referring to the specific entity's DID and said another entity's DID or (i-2) a process of allowing the identity contract to acquire the specific entity's public key and said another entity's public key from the blockchain network by referring to the specific entity's DID and said another entity's DID, (ii) a process of verifying the setting information by decrypting said another entity's signature value with said another entity's public key, and (iii) a process of verifying the confirmation information by decrypting the specific entity's signature value with the specific entity's public key, to thereby verify the request for the registration of the relational information.

As one example, if a request for said another entity's public key is acquired from the specific entity's device in response to the setting information transmitted from said another entity's device wherein said another entity's public key corresponds to said another entity's DID or if a request for another entity's public information is acquired from a resolving server in response to a request for another entity's DID document from the specific entity's device wherein said another entity's public information is registered in the blockchain network as corresponding to said another entity's DID and includes the relational information and another entity's public key corresponding to said another entity's DID, the blockchain node performs or supports another device to perform (1) one of (i) in response to the request for said another entity's public key from the specific entity's device, (i-1) a process of acquiring said another entity's public key from the blockchain network by referring to said another entity's DID or a process of allowing the identity contract to acquire said another entity's public key from the blockchain network by referring to said another entity's DID, and (i-2) a process of transmitting said another entity's public key to the specific entity's device, and (ii) in response to the request for said another entity's public information from the resolving server, (ii-1) a process of acquiring another entity's public information from the blockchain network by referring to said another entity's DID or a process of allowing the identity contract to acquire said another entity's public information from the blockchain network by referring to said another entity's DID, and (ii-2) a process of allowing the resolving server to modify said another entity's public information into said another entity's DID document and thus to transmit said another entity's DID document to the specific entity's device, and as a result, (2) a process of allowing the specific entity's device to (i) verify the setting information by decrypting said another entity's signature value with said another entity's public key acquired from the blockchain node or from said another entity's DID document, and (ii) if the setting information is determined as verified, broadcast the request for the registration of the relational information to the blockchain network.

As one example, if the setting information broadcast from said another entity's device to the blockchain network is acquired, the blockchain node performs or supports another device to perform a process of transmitting the setting information to the specific entity's device or a process of allowing the identity contract to transmit the setting information to the specific entity's device, to thereby allow the specific entity's device to broadcast the request for the registration of the relational information to the blockchain network in response to a verification result on the setting information which is verified by the specific entity's device and thus acquire the request for the registration of the relational information.

As one example, if the setting information is broadcast from said another entity's device to the blockchain network, the blockchain node performs or supports another device to perform (i) a process of acquiring another entity's public key from the blockchain network by referring to said another entity's DID or a process of allowing the identity contract to acquire said another entity's public key from the blockchain network by referring to said another entity's DID, (ii) a process of verifying the setting information by decrypting said another entity's signature value with said another entity's public key, and (iii) if the setting information is determined as verified, a process of transmitting the setting information to the specific entity's device or a process of allowing the identity contract to transmit a verification result on the setting information to said another entity's device and thus to allow said another entity's device to transmit the setting information to the specific entity's device, and wherein, if the confirmation information is broadcast from the specific entity's device to the blockchain network, the blockchain node performs or supports another device to perform (i) a process of acquiring a specific entity's public key from the blockchain network by referring to the specific entity's DID, or a process of allowing the identity contract to acquire the specific entity's public key from the blockchain network by referring to the specific entity's DID, and (ii) a process of verifying the confirmation information by decrypting the specific entity's signature value with the specific entity's public key.

In accordance with another aspect of the present disclosure, there is provided a blockchain node for providing a relational DID (decentralized identifier) service, including: at least one memory that stores instructions; and at least one processor configured to execute the instructions to perform or support another device to perform: (I) if a request for registration of relational information is broadcast from a specific entity's device to a blockchain network, wherein the relational information represents information on a relation between a specific entity's DID of a specific entity and another entity's DID of another entity and wherein the relational information is set by said another entity and confirmed by the specific entity, one of (i) a process of verifying the request for the registration of the relational information and (ii) a process of transmitting the request for the registration of the relational information to an identity contract registered in the blockchain network, to thereby allow the identity contract to verify the request for the registration of the relational information, and (II) one of (i) a process of registering the relational information in the blockchain network as corresponding to the specific entity's DID and said another entity's DID if the request for the registration of the relational information is determined as verified by the blockchain node, and (ii) a process of allowing the identity contract to register the relational information in the blockchain network as corresponding to the specific entity's DID and said another entity's DID if the request for the registration of the relational information is determined as verified by the identity contract.

As one example, the processor further performs or supports another device to perform: (III) if a request for the relational information is acquired from a service providing server in response to a request for a service transmitted from the specific entity's device wherein the service is accessible with said another entity's DID or if a request for DID public information is acquired from a resolving server in response to a request for a DID document from the service providing server, wherein the request for the DID document is at least one of a request for a specific entity's DID document and a request for another entity's DID document, wherein the DID public information includes at least one of specific entity's public information and another entity's public information, wherein the specific entity's public information is registered in the blockchain network as corresponding to the specific entity's DID and includes the relational information and a specific entity's public key corresponding to the specific entity's DID, and wherein said another entity's public information is registered in the blockchain network as corresponding to said another entity's DID and includes the relational information and another entity's public key corresponding to said another entity's DID, (1) one of (i) in response to the request for the relational information from the service providing server, (i-1) a process of acquiring the relational information from the blockchain network by referring to the specific entity's DID or said another entity's DID or a process of allowing the identity contract to acquire the relational information from the blockchain network by referring to the specific entity's DID or said another entity's DID, and (i-2) a process of transmitting the relational information to the service providing server, and (ii) in response to the request for the DID public information from the resolving server, (ii-1) a process of acquiring the DID public information from the blockchain network by referring to at least one of the specific entity's DID and said another entity's DID or a process of allowing the identity contract to acquire the DID public information from the blockchain network by referring to at least one of the specific entity's DID and said another entity's DID, and (ii-2) a process of allowing the resolving server to modify the DID public information into the DID document and thus to transmit the DID document to the service providing server, and as a result, (2) a process of allowing the service providing server to (i) confirm a relation between the specific entity's DID and said another entity's DID by referring to one of the relational information acquired from the blockchain node and the relational information acquired from the DID document, and (ii) if the relation between the specific entity's DID and said another entity's DID is confirmed by using the relational information, provide the service corresponding to said another entity's DID to the specific entity's device.

As one example, the request for the service transmitted from the specific entity's device includes a specific entity's signature value created by encrypting the request for the service with a specific entity's private key corresponding to the specific entity's DID, and wherein, if a request for the specific entity's public key corresponding to the specific entity's DID is acquired from the service providing server or if a request for the specific entity's public information is acquired from the resolving server in response to the request for the specific entity's DID document from the service providing server, the processor performs or supports another device to perform (1) one of (i) in response to the request for the specific entity's public key from the service providing server, (i-1) a process of acquiring the specific entity's public key corresponding to the specific entity's DID from the blockchain network by referring to the specific entity's DID or a process of allowing the identity contract to acquire the specific entity's public key from the blockchain network by referring to the specific entity's DID, and (i-2) a process of transmitting the specific entity's public key to the service providing server and (ii) in response to the request for the specific entity's public information from the resolving server, (ii-1) a process of acquiring the specific entity's public information from the blockchain network by referring to the specific entity's DID or a process of allowing the identity contract to acquire the specific entity's public information from the blockchain network by referring to the specific entity's DID, and (ii-2) a process of allowing the resolving server to modify the specific entity's public information into the specific entity's DID document and thus to transmit the specific entity's DID document to the service providing server, and as a result, (2) a process of allowing the service providing server to (i) verify the specific entity's signature value by decrypting the specific entity's signature value with the specific entity's public key acquired from the blockchain node or from the specific entity's DID document, and (ii) if the specific entity's signature value is determined as verified, broadcast the request for the relational information to the blockchain network.

As one example, at the process of (I), the request for the registration of the relational information includes setting information and confirmation information, wherein another entity's device corresponding to said another entity's DID creates the setting information by setting a relation between the specific entity's DID and said another entity's DID and wherein the specific entity's device creates the confirmation information by confirming the relation between the specific entity's DID and said another entity's DID.

As one example, the setting information includes (1) the relational information representing a relation between the specific entity's DID and said another entity's DID, and (2) another entity's signature value created by encrypting the relational information with another entity's private key corresponding to said another entity's DID, and wherein the confirmation information includes (1) the relational information and (2) a specific entity's signature value created by encrypting the relational information with a specific entity's private key corresponding to the specific entity's DID, and wherein the processor performs or supports another device to perform (i) (i-1) a process of acquiring a specific entity's public key corresponding to the specific entity's DID and another entity's public key corresponding to said another entity's DID from the blockchain network by referring to the specific entity's DID and said another entity's DID or (i-2) a process of allowing the identity contract to acquire the specific entity's public key and said another entity's public key from the blockchain network by referring to the specific entity's DID and said another entity's DID, (ii) a process of verifying the setting information by decrypting said another entity's signature value with said another entity's public key, and (iii) a process of verifying the confirmation information by decrypting the specific entity's signature value with the specific entity's public key, to thereby verify the request for the registration of the relational information.

As one example, if a request for said another entity's public key is acquired from the specific entity's device in response to the setting information transmitted from said another entity's device wherein said another entity's public key corresponds to said another entity's DID or if a request for another entity's public information is acquired from a resolving server in response to a request for another entity's DID document from the specific entity's device wherein said another entity's public information is registered in the blockchain network as corresponding to said another entity's DID and includes the relational information and another entity's public key corresponding to said another entity's DID, the processor performs or supports another device to perform (1) one of (i) in response to the request for said another entity's public key from the specific entity's device, (i-1) a process of acquiring said another entity's public key from the blockchain network by referring to said another entity's DID or a process of allowing the identity contract to acquire said another entity's public key from the blockchain network by referring to said another entity's DID, and (i-2) a process of transmitting said another entity's public key to the specific entity's device, and (ii) in response to the request for said another entity's public information from the resolving server, (ii-1) a process of acquiring another entity's public information from the blockchain network by referring to said another entity's DID or a process of allowing the identity contract to acquire said another entity's public information from the blockchain network by referring to said another entity's DID, and (ii-2) a process of allowing the resolving server to modify said another entity's public information into said another entity's DID document and thus to transmit said another entity's DID document to the specific entity's device, and as a result, (2) a process of allowing the specific entity's device to (i) verify the setting information by decrypting said another entity's signature value with said another entity's public key acquired from the blockchain node or from said another entity's DID document, and (ii) if the setting information is determined as verified, broadcast the request for the registration of the relational information to the blockchain network.

As one example, if the setting information broadcast from said another entity's device to the blockchain network is acquired, the processor performs or supports another device to perform a process of transmitting the setting information to the specific entity's device or a process of allowing the identity contract to transmit the setting information to the specific entity's device, to thereby allow the specific entity's device to broadcast the request for the registration of the relational information to the blockchain network in response to a verification result on the setting information which is verified by the specific entity's device and thus acquire the request for the registration of the relational information.

As one example, if the setting information is broadcast from said another entity's device to the blockchain network, the processor performs or supports another device to perform (i) a process of acquiring another entity's public key from the blockchain network by referring to said another entity's DID or a process of allowing the identity contract to acquire said another entity's public key from the blockchain network by referring to said another entity's DID, (ii) a process of verifying the setting information by decrypting said another entity's signature value with said another entity's public key, and (iii) if the setting information is determined as verified, a process of transmitting the setting information to the specific entity's device or a process of allowing the identity contract to transmit a verification result on the setting information to said another entity's device and thus to allow said another entity's device to transmit the setting information to the specific entity's device, and wherein, if the confirmation information is broadcast from the specific entity's device to the blockchain network, the processor performs or supports another device to perform (i) a process of acquiring a specific entity's public key from the blockchain network by referring to the specific entity's DID, or a process of allowing the identity contract to acquire the specific entity's public key from the blockchain network by referring to the specific entity's DID, and (ii) a process of verifying the confirmation information by decrypting the specific entity's signature value with the specific entity's public key.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which:

FIG. 2 is a drawing schematically illustrating a method for providing the relational decentralized identifier service in accordance with one example embodiment of the present disclosure.

FIG. 3 is a drawing schematically illustrating a method for providing the relational decentralized identifier service in accordance with another example embodiment of the present disclosure.

FIG. 4 is a drawing schematically illustrating a method for providing the relational decentralized identifier service in accordance with still another example embodiment of the present disclosure.

FIG. 5 is a drawing schematically illustrating a method for providing the relational decentralized identifier service in accordance with still yet another example embodiment of the present disclosure.

DETAILED DESCRIPTION OF THE PREFERRED EMBODIMENTS

Figure 1:
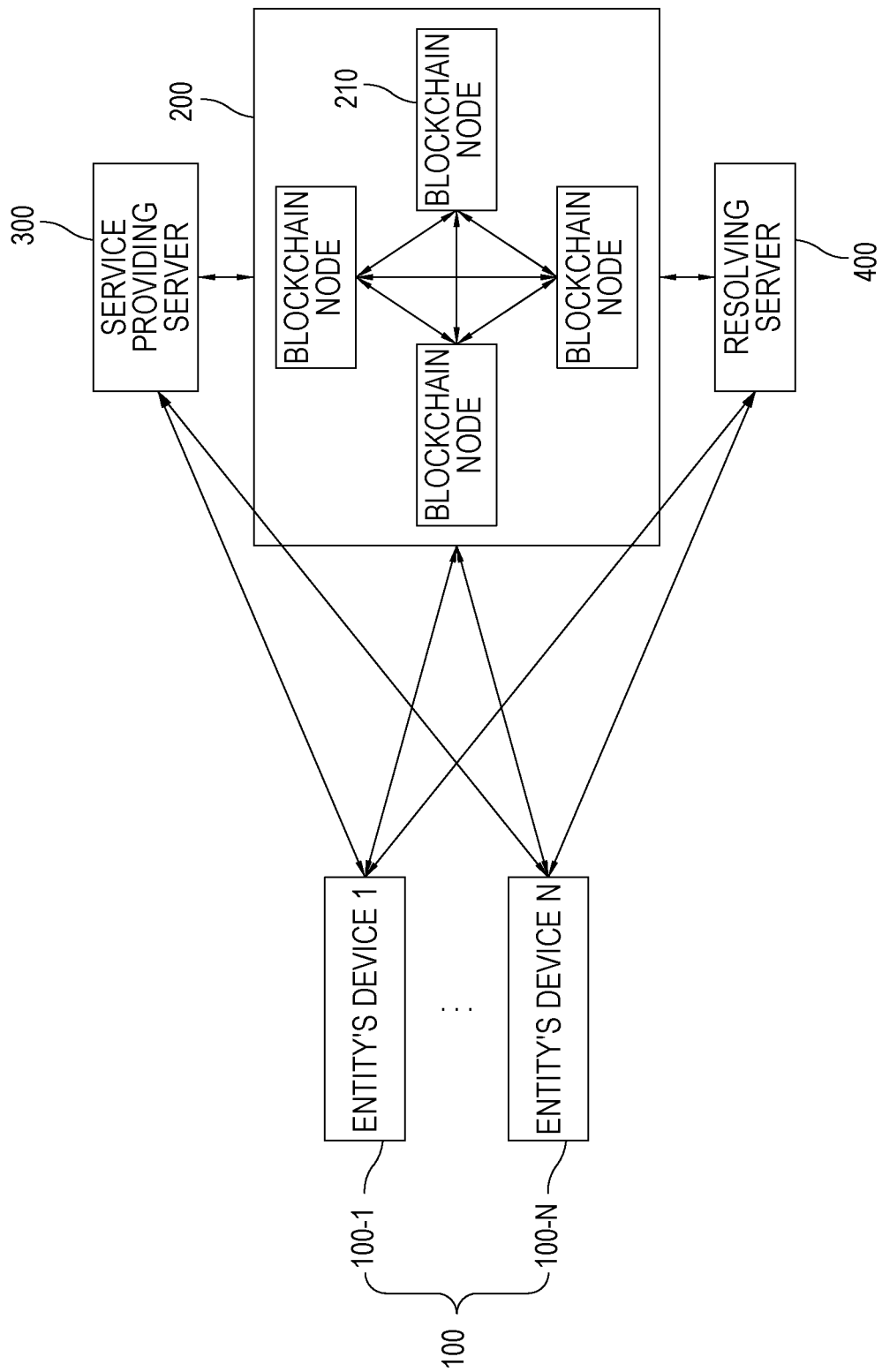
FIG. 1 is a drawing schematically illustrating a system for providing a relational decentralized identifier service in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments.

To allow those skilled in the art to the present disclosure to be carried out easily, the example embodiments of the present disclosure by referring to attached diagrams will be explained in detail as shown below.

FIG. 1 is a drawing schematically illustrating a system for providing a relational decentralized identifier service in accordance with one example embodiment of the present disclosure. The system may include entity's devices 100, a blockchain network 200, a service providing server 300, and a resolving server 400.

First, each of the entity's devices 100 may correspond to each of entities who/which has intention to use the relational decentralized identifier service, and may store (1) its issued DID (decentralized identifier) and (2) its PI (personal identity) or a VC (verifiable credential). Herein, the personal identity may correspond to the DID, and a certificate authority may create the VC by authenticating the personal identity. Herein, the entities may include users, IoT (Internet of things) devices, etc., but the scope of the present disclosure is not limited thereto, and may include any object which can be identified by a DID.

Next, multiple blockchain nodes in the blockchain network 200 may share distributed ledgers. The blockchain network 200 may generate blocks by a distributed consensus and store the generated blocks, in a form of chain, in the distributed ledgers, may generate the DIDs in response to requests from the users and/or the computing devices, and may store the data corresponding to the DIDs in the distributed ledgers. And, the blockchain network 200 may allow a registered identity contract to process data related to the DIDs.

Also, in response to a request for registration of relational information among the entity's devices 100, the blockchain network 200 may register the relational information among the entities and provide a relational DID service.

Herein, the blockchain network 200 may be comprised of the multiple blockchain nodes, and each of the multiple blockchain nodes 210 may include a memory (not illustrated) for storing instructions to provide the relational DID service, and a processor (not illustrated) for performing processes of providing the relational DID service, according to the instructions stored in the memory. And, the blockchain node 210 may include a mobile computer, a PDA/EDA (personal/enterprise digital assistant), a mobile phone, a smart-phone, a tablet, and a server, but the scope of the present disclosure is not limited thereto, and may include any computing device which performs computational operation, such as a digital camera, a personal navigation device, and a mobile gaming device capable of wired and wireless communication, etc.

Specifically, the blockchain node 210 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processors of such devices may include hardware configuration of MPU (Micro Processing Unit) or CPU (Central Processing Unit), cache memory, data bus, etc. Additionally, any OS (operating system) and software configuration of applications that achieve specific purposes may be further included.

Next, the service providing server 300 may provide a service requested from each of the entity's devices 100.

Then, the resolving server 400 may acquire the data, i.e., public information, which are registered in the blockchain network as corresponding to the DIDs. Herein, the resolving server 400 may be the computing device capable of accessing a network or may be a blockchain node in the blockchain network.

A method for providing the relational DID service using the system configured as such in accordance with one example embodiment of the present disclosure is described as follows by referring to FIG. 2.

First, a specific entity and another entity may respectively register a specific entity's DID and another entity's DID in the blockchain network 200 by respectively using a specific entity's device 110 and another entity's device 120. And, the blockchain network 200 may store (i) a specific entity's public key, a specific entity's virtual asset address, etc. which are specific entity's public information corresponding to the specific entity's DID, and (ii) another entity's public key, another entity's virtual asset address, etc. which are another entity's public information corresponding to said another entity's DID. Herein, the blockchain network 200 may allow the registered identity contract to perform operation related to the DIDs. And, the identity contract may be a smart contract which performs the operation related to the DIDs, may be configured as operation code for performing the operation related to the DIDs, and may be executed on the blockchain network. Also, the identity contract may include the operation code to be used for interaction with other smart contracts which utilize the DIDs. And if an entity requests other services accessible with the DIDs, the identity contract may allow the entity to use said other services through the interaction with said other smart contracts.

Thereafter, in order to set a relation between the specific entity and said another entity through said another entity's device 120, said another entity may transmit setting information to the specific entity's device 110 at a step of S1. Herein, the setting information may represent required information to be used for setting the relation between the specific entity and said another entity.

Also, the setting information may include (1) the relational information representing the relation between the specific entity's DID and said another entity's DID, respectively corresponding to the specific entity and said another entity, and (2) another entity's signature value created by encrypting the relational information with another entity's private key corresponding to said another entity's DID. And the relational information may include information on relations among various entities, for example, an IoT device and its owner, a parent and his/her child, an employee and his/her employer, a student and his/her professor, etc. As used in this specification and the appended claims, the singular forms "a," "an," and "the" include plural referents, i.e., one or more, unless the content and context clearly dictates otherwise. As one example, the relational information may be set as representing that "the specific entity's DID is the owner of said another entity's DID".

Then, the specific entity's device 110 may verify the setting information transmitted from said another entity's device 120, at a step of S4.

As one example, in order to acquire said another entity's public key corresponding to said another entity's DID, the specific entity's device 110 may broadcast a request for said another entity's public key to the blockchain network 200 at a step of S2. Then, in response to the request for said another entity's public key, at least one blockchain node 210 in the blockchain network 200 may perform or support another device to perform (i) a process of acquiring said another entity's public key corresponding to said another entity's DID from the blockchain network 200, and (ii) a process of transmitting said another entity's public key, acquired from the blockchain network 200, to the specific entity's device 110 at a step of S3. As another example, the blockchain node 210 may perform or support another device to perform (i) a process of allowing the identity contract registered in the blockchain network 200 to acquire said another entity's public key from the blockchain network 200 by referring to said another entity's DID, and (ii) a process of transmitting said another entity's public key to the specific entity's device 110 at the step of S3. And, the specific entity's device 110 may verify the setting information by decrypting another entity's signature value with said another entity's public key transmitted from the blockchain node 210, at a step of S4. Herein, the setting information may be verified by determining whether the relational information acquired by decrypting said another entity's signature value is identical to the relational information included in the setting information.

Thereafter, if the setting information is determined as verified, the specific entity's device 110 may broadcast the request for the registration of the relational information to the blockchain network 200 at a step of S5.

Herein, the request for the registration of the relational information may include (1) the setting information transmitted from said another entity's device 120 and (2) confirmation information which is created at the specific entity's device 110 by confirming the relation between the specific entity's DID and said another entity's DID. And, the confirmation information may include (1) the relational information and (2) a specific entity's signature value created by encrypting the relational information with a specific entity's private key corresponding to the specific entity's DID.

And, the blockchain node 210 may perform or support another device to perform a process of receiving the request for the registration of the relational information and a process of verifying the request for the registration of the relational information at a step of S6. Herein, the registration of the relational information has been broadcast to the blockchain network 200 from the specific entity's device 110.

As one example, the blockchain node 210 may perform or support another device to perform a process of acquiring the specific entity's public key and said another entity's public key from the blockchain network 200 by referring to the specific entity's DID and said another entity's DID. As another example, the blockchain node 210 may perform or support another device to perform a process of allowing the identity contract to acquire the specific entity's public key and said another entity's public key from the blockchain network 200 by referring to the specific entity's DID and said another entity's DID. And, the blockchain node 210 may perform or support another device to perform (i) a process of verifying the setting information by decrypting said another entity's signature value, included in the setting information, with said another entity's public key, and (ii) a process of verifying the confirmation information by decrypting the specific entity's signature value, included in the confirmation information, with the specific entity's public key, to thereby verify the request for the registration of the relational information. Herein, the setting information may be verified by determining whether the relational information acquired by decrypting said another entity's signature value is identical to the relational information included in the setting information. And the confirmation information may be verified by determining whether the relational information acquired by decrypting the specific entity's signature value is identical to the relational information included in the confirmation information.

Meanwhile, as another example different from verifying the request for the registration of the relational information by the blockchain node 210 itself, the blockchain node 210 may perform or support another device to perform a process of transmitting the request for the registration of the relational information to the identity contract, to thereby allow the identity contract to verify the request for the registration of the relational information.

Thereafter, the blockchain node 210 may perform or support another device to perform one of (i) a process of registering the relational information in the blockchain network 200 as corresponding to the specific entity's DID and said another entity's DID if the request for the registration of the relational information is determined as verified by the blockchain node, at a step of S7, and (ii) a process of allowing the identity contract to register the relational information in the blockchain network 200 as corresponding to the specific entity's DID and said another entity's DID if the request for the registration of the relational information is determined as verified by the identity contract, at the step of S7.

Meanwhile, said another entity's device 120 is shown above as transmitting the setting information to the specific entity's device 110, but as another example, the setting information may be transmitted to the specific entity's device 110 by the blockchain network 200.

That is, if said another entity's device 120 broadcasts the setting information to the blockchain network 200, the blockchain node 210 may receive the setting information and then may transmit or allow the identity contract to transmit the setting information to the specific entity's device 110. And, if the specific entity's device 110 broadcasts the request for the registration of the relational information to the blockchain network 200 where the request for the registration of the relational information includes the setting information and the confirmation information, then the blockchain node 210 may acquire the request for the registration of the relational information which has been broadcast to the blockchain network 200.

On condition that the relational information on a relation between the specific entity's DID and said another entity's DID have been registered in the blockchain network 200 as above, in order to provide the specific entity with a service which is accessible with said another entity's DID, a request for the service may be transmitted to the service providing server 300 by using the specific entity's device 110 at a step of S8. Herein, the request for the service may include the specific entity's signature value created by encrypting the request for the service with the specific entity's private key corresponding to the specific entity's DID.

Then, the service providing server 300 may verify the request for the service, where the service is accessible with said another entity's DID, transmitted from the specific entity's device 110, at a step of S11.

As one example, the service providing server 300 may broadcast a request for the specific entity's public key, corresponding to the specific entity's DID, to the blockchain network 200 at a step of S9. Then, the blockchain node 210 may perform or support another device to perform (i) a process of acquiring the request for the specific entity's public key broadcast to the blockchain network 200, (ii) a process of acquiring the specific entity's public key, corresponding to the specific entity's DID, from the blockchain network 200 in response to the request for the specific entity's public key, and (iii) a process of transmitting the specific entity's public key, acquired from the blockchain network 200, to the service providing server 300 at a step of S10. As another example, the blockchain node 210 may perform or support another device to perform (i) a process of allowing the identity contract registered in the blockchain network 200 to acquire the specific entity's public key from the blockchain network 200 by referring to the specific entity's DID, and (ii) a process of transmitting the specific entity's public key to the service providing server 300 at the step of S10. And, the service providing server 300 may verify the request for the service by decrypting the specific entity's signature value, which is included in the request for the service, with the specific entity's public key transmitted from the blockchain node 210, at a step of S11. Herein, the request for the service may be verified by determining whether the request for the service acquired by decrypting the specific entity's signature value is identical to the request for the service transmitted from the specific entity's device 110.

Thereafter, if the request for the service is determined as verified, the service providing server 300 may broadcast a request for the relational information to the blockchain network 200 at a step of S12.

Herein, the request for the relational information may include the specific entity's DID or said another entity's DID.

And, the blockchain node 210 may perform or support another device to perform (i) a process of receiving the request for the relational information broadcast to the blockchain network 200, (ii) in response to the request for the relational information, one of (ii-1) a process of acquiring the relational information from the blockchain network 200 by referring to the specific entity's DID or said another entity's DID and (ii-2) a process of allowing the identity contract to acquire the relational information from the blockchain network 200 by referring to the specific entity's DID or said another entity's DID, and (iii) a process of transmitting the relational information to the service providing server 300 at a step of S13.

And, the service providing server 300 may confirm the relation between the specific entity's DID and said another entity's DID by referring to the relational information acquired from the blockchain node 210, at a step of S14.

Thereafter, if the relation between the specific entity's DID and said another entity's DID is confirmed by referring to the relational information, then the service accessible with said another entity's DID may be provided to the specific entity's device 110 at a step of S15. As one example, if the relational information represents that "the specific entity's DID is the owner of said another entity's DID", and if the request for the service represents a log-on request using said another entity's DID, the service providing server 300 may confirm that the specific entity's DID is the owner of said another entity's DID by referring to the relational information, and may allow the specific entity's device 110 to log-on by using said another entity's DID.

FIG. 3 is a drawing schematically illustrating a method for providing the relational DID service in accordance with another example embodiment of the present disclosure. The method for providing the relational DID service in accordance with another example embodiment of the present disclosure is described by referring to FIG. 3 as follows.

In order to set the relation with the specific entity, said another entity may transmit the setting information to the specific entity's device 110 at a step of S21. Herein, the setting information may represent the relation between the specific entity and said another entity, where the relation may be set by using said another entity's device 120.

Herein, the setting information may include (1) the relational information representing the relation between the specific entity's DID and said another entity's DID, respectively corresponding to the specific entity and said another entity, and (2) said another entity's signature value created by encrypting the relational information with said another entity's private key corresponding to said another entity's DID. And the relational information may include information on relations among various entities, such as an IoT device and its owner, a parent and his/her child, an employee and his/her employer, a student and his/her professor, etc. As one example, the relational information may be set as representing that "the specific entity's DID is the owner of said another entity's DID".

Then, the specific entity's device 110 may verify the setting information transmitted from said another entity's device 120, at a step of S26.

As one example, in order to acquire said another entity's public key corresponding to said another entity's DID, the specific entity's device 110 may transmit a request for another entity's DID document, corresponding to said another entity's DID, to the resolving server 400, at a step of S22. And, in response to the request for said another entity's DID document from the specific entity's device 110, the resolving server 400 may broadcast a request for said another entity's public information to the blockchain network 200 at a step of S23. Herein, said another entity's public information may be registered in the blockchain network 200 as corresponding to said another entity's DID and may include the relational information and another entity's public key corresponding to said another entity's DID. Then, in response to the request for said another entity's public information, at least one blockchain node 210 in the blockchain network 200 may perform or support another device to perform (i) a process of acquiring said another entity's public information corresponding to said another entity's DID from the blockchain network 200, and (ii) a process of transmitting said another entity's public information, acquired from the blockchain network 200, to the resolving server 400 at a step of S24. As another example, the blockchain node 210 may perform or support another device to perform (i) a process of allowing the identity contract registered in the blockchain network 200 to acquire said another entity's public information from the blockchain network 200 by referring to said another entity's DID, and (ii) a process of transmitting said another entity's public information to the resolving server 400. And, the resolving server 400 may modify said another entity's public information, transmitted from the blockchain node 210, into said another entity's DID document, and may transmit said another entity's DID document to the specific entity's device 110 at a step of S25. Then, the specific entity's device 110 may acquire said another entity's public key from said another entity's DID document which is transmitted from the resolving server 400, and may verify the setting information by decrypting said another entity's signature value with said another entity's public key, at the step of S26. Herein, the setting information may be verified by determining whether the relational information acquired by decrypting said another entity's signature value is identical to the relational information included in the setting information.

Thereafter, if the setting information is determined as verified, the specific entity's device 110 may broadcast the request for the registration of the relational information to the blockchain network 200 at a step of S27.

Herein, the request for the registration of the relational information may include (1) the setting information transmitted from said another entity's device 120 and (2) the confirmation information where the specific entity's device 110 may create the confirmation information by confirming the relational information between the specific entity's DID and said another entity's DID. And, the confirmation information may include (1) the relational information and (2) the specific entity's signature value created by encrypting the relational information with the specific entity's private key corresponding to the specific entity's DID.

And, the blockchain node 210 may perform or support another device to perform a process of receiving the request for the registration of the relational information where the request is broadcast to the blockchain network 200 by the specific entity's device 110, and a process of verifying the request for the registration of the relational information at a step of S28.

As one example, the blockchain node 210 may perform or support another device to perform a process of acquiring the specific entity's public key and said another entity's public key from the blockchain network 200 by referring to the specific entity's DID and said another entity's DID. As another example, the blockchain node 210 may perform or support another device to perform a process of allowing the identity contract to acquire the specific entity's public key and said another entity's public key from the blockchain network 200 by referring to the specific entity's DID and said another entity's DID. And, the blockchain node 210 may perform or support another device to perform a process of verifying the setting information by decrypting said another entity's signature value, included in the setting information, with said another entity's public key, and a process of verifying the confirmation information by decrypting the specific entity's signature value, included in the confirmation information, with the specific entity's public key, to thereby verify the request for the registration of the relational information. Herein, the setting information may be verified by determining whether the relational information acquired by decrypting said another entity's signature value is identical to the relational information included in the setting information. And the confirmation information may be verified by determining whether the relational information acquired by decrypting the specific entity's signature value is identical to the relational information included in the confirmation information.

Meanwhile, as another example different from verifying the request for the registration of the relational information by the blockchain node 210 itself, the blockchain node 210 may perform or support another device to perform a process of transmitting the request for the registration of the relational information to the identity contract, to thereby allow the identity contract to verify the request for the registration of the relational information.

Thereafter, the blockchain node 210 may perform or support another device to perform one of (i) a process of registering the relational information in the blockchain network 200 as corresponding to the specific entity's DID and said another entity's DID if the request for the registration of the relational information is determined as verified by the blockchain node, at a step of S29, and (ii) a process of allowing the identity contract to register the relational information in the blockchain network 200 as corresponding to the specific entity's DID and said another entity's DID if the request for the registration of the relational information is determined as verified by the identity contract, at the step of S29.

Meanwhile, said another entity's device 120 is shown above as transmitting the setting information to the specific entity's device 110, but as another example, the setting information may be transmitted to the specific entity's device 110 by the blockchain network 200.

That is, if said another entity's device 120 broadcasts the setting information to the blockchain network 200, the blockchain node 210 may receive the setting information broadcast to the blockchain network 200, and may transmit or allow the identity contract to transmit the setting information to the specific entity's device 110.

On condition that the relational information on a relation between the specific entity's DID and said another entity's DID have been registered in the blockchain network 200 as above, in order to provide the specific entity with the service which is accessible with said another entity's DID, the request for the service may be transmitted to the service providing server 300 by using the specific entity's device 110 at a step of S30. Herein, the request for the service may include the specific entity's signature value created by encrypting the request for the service with the specific entity's private key corresponding to the specific entity's DID.

Then, the service providing server 300 may verify the request for the service, where the service is accessible with said another entity's DID, transmitted from the specific entity's device 110, at a step of S35.

As one example, in order to acquire the specific entity's public key corresponding to the specific entity's DID, the specific entity's device 300 may transmit the request for the specific entity's DID document, corresponding to the specific entity's DID, to the resolving server 400, at a step of S31. And, in response to the request for the specific entity's DID document from the service providing server 300, the resolving server 400 may broadcast the request for the specific entity's public information to the blockchain network 200 at a step of S32. Herein, the specific entity's public information may be registered in the blockchain network 200 as corresponding to the specific entity's DID and may include the relational information and the specific entity's public key corresponding to the specific entity's DID. Then, in response to the request for the specific entity's public information, at least one blockchain node 210 in the blockchain network 200 may perform or support another device to perform (i) a process of acquiring the specific entity's public information, corresponding to the specific entity's DID, from the blockchain network 200, and (ii) a process of transmitting the specific entity's public information, acquired from the blockchain network 200, to the resolving server 400 at a step of S33. As another example, the blockchain node 210 may perform or support another device to perform (i) a process of allowing the identity contract registered in the blockchain network 200 to acquire the specific entity's public information from the blockchain network 200 by referring to the specific entity's DID, and (ii) a process of transmitting the specific entity's public information to the resolving server 400. And, the resolving server 400 may modify the specific entity's public information, transmitted from the blockchain node 210, into the specific entity's DID document, and may transmit the specific entity's DID document to the service providing server 300 at a step of S34. And, the service providing server 300 may acquire the specific entity's public key from the specific entity's DID document which is transmitted from the resolving server 400, and may verify the request for the service by decrypting the specific entity's signature value, which is included in the request for the service, with the specific entity's public key, at a step of S35. Herein, the request for the service may be verified by determining whether the request for the service acquired by decrypting the specific entity's signature value is identical to the request for the service transmitted from the specific entity's device 110.

Thereafter, if the request for the service is determined as verified, the service providing server 300 may transmit the request for the DID document to the resolving server 400 at a step of S36.

Herein, the request for the DID document may be at least one of the request for the specific entity's DID document and the request for said another entity's DID document.

Then, in response to the request for the DID document from the service providing server 300, the resolving server 400 may broadcast the request for the DID public information, corresponding to the request for the DID document, to the blockchain network 200 at a step of S37.

Herein, the DID public information may include at least one of the specific entity's public information and said another entity's public information. And, the specific entity's public information may be registered in the blockchain network 200 as corresponding to the specific entity's DID and may include the relational information and the specific entity's public key corresponding to the specific entity's DID. Also, said another entity's public information may be registered in the blockchain network 200 as corresponding to said another entity's DID and may include the relational information and another entity's public key corresponding to said another entity's DID.

And, the blockchain node 210 may perform or support another device to perform (i) a process of receiving the request for the DID public information broadcast to the blockchain network 200, (ii) in response to the request for the DID public information, one of (ii-1) a process of acquiring the DID public information from the blockchain network 200 by referring to at least one of the specific entity's DID and said another entity's DID, and (ii-2) a process of allowing the identity contract to acquire the DID public information from the blockchain network 200 by referring to at least one of the specific entity's DID and said another entity's DID, and (iii) a process of transmitting the DID public information to the resolving server 400 at a step of S38.

Then, the resolving server 400 may modify the DID public information into the DID document, and may transmit the DID document to the service providing server 300 at a step of S39.

And, the service providing server 300 may confirm the relation between the specific entity's DID and said another entity's DID by referring to the relational information acquired from the DID document, at a step of S40.

Thereafter, if the relation between the specific entity's DID and said another entity's DID is confirmed by referring to the relational information, the service accessible with said another entity's DID may be provided to the specific entity's device 110 at a step of S41. As one example, if the relational information represents that "the specific entity's DID is the owner of said another entity's DID", and if the request for the service represents a log-on request using said another entity's DID, the service providing server 300 may confirm that the specific entity's DID is the owner of said another entity's DID by referring to the relational information, and may allow the specific entity's device 110 to log-on by using said another entity's DID.

FIG. 4 is a drawing schematically illustrating a method for providing the relational DID service in accordance with still another example embodiment of the present disclosure. The method for providing the relational DID service in accordance with still another example embodiment of the present disclosure is described by referring to FIG. 4 as follows. In the description below, the part easily deducible from the explanation of FIGS. 2 and 3 will be omitted.

In order to set the relation with the specific entity, said another entity may broadcast the setting information to the blockchain network 200 at a step of S51. Herein, the setting information may represent the relation between the specific entity and said another entity, where the relation may be set by using said another entity's device 120.

Herein, the setting information may include (1) the relational information representing the relation between the specific entity's DID and said another entity's DID, respectively corresponding to the specific entity and said another entity, and (2) said another entity's signature value created by encrypting the relational information with said another entity's private key corresponding to said another entity's DID. And the relational information may include information on relations among various entities, such as an IoT device and its owner, a parent and his/her child, an employee and his/her employer, a student and his/her professor, etc. As one example, the relational information may be set as representing that "the specific entity's DID is the owner of said another entity's DID".

Then, at least one blockchain node 210 in the blockchain network 200 may receive the setting information broadcast to the blockchain network 200, and may verify the received setting information at a step of S52.

As one example, the blockchain node 210 may perform or support another device to perform a process of acquiring said another entity's public key from the blockchain network 200 by referring to said another entity's DID. As another example, the blockchain node 210 may perform or support another device to perform a process of allowing the identity contract to acquire said another entity's public key from the blockchain network 200 by referring to said another entity's DID. And, the blockchain node 210 may perform or support another device to perform a process of verifying the setting information by decrypting said another entity's signature value, included in the setting information, with said another entity's public key. Herein, the setting information may be verified by determining whether the relational information acquired by decrypting said another entity's signature value is identical to the relational information included in the setting information. Meanwhile, as another example different from verifying the setting information by the blockchain node 210 itself, the blockchain node 210 may perform or support another device to perform a process of transmitting the setting information to the identity contract, to thereby allow the identity contract to verify the setting information.

Thereafter, if the setting information is determined as verified, the blockchain node 210 may perform or support another device to perform a process of transmitting the setting information, acquired from said another entity's device 120, to the specific entity's device 110 at a step of S53. Also, the blockchain node 210 may allow the identity contract to transmit a verification result on the setting information to said another entity's device 120, to thereby allow said another entity's device 120 to transmit the setting information to the specific entity's device 110.

And, the specific entity's device 110 may display the setting information, to thereby allow the specific entity to confirm the setting information, and if the specific entity confirms and approves the relational information between the specific entity's DID and said another entity's DID, then the specific entity's device 110 may broadcast the request for the registration of the relational information to the blockchain network 200 at a step of S54.

Herein, the request for the registration of the relational information may include (1) the setting information transmitted from said another entity's device 120 and (2) the confirmation information where the specific entity's device 110 may create the confirmation information by confirming the relational information between the specific entity's DID and said another entity's DID. And, the confirmation information may include (1) the relational information and (2) the specific entity's signature value created by encrypting the relational information with the specific entity's private key corresponding to the specific entity's DID. As another example, if the setting information transmitted from said another entity's device 120 is stored in the blockchain node 210, the confirmation information may be broadcast to the blockchain network 200 as the request for the registration of the relational information.

Then, the blockchain node 210 may perform or support another device to perform a process of receiving the request for the registration of the relational information where the request is broadcast to the blockchain network 200 by the specific entity's device 110, and a process of verifying the request for the registration of the relational information at a step of S55.

As one example, the blockchain node 210 may perform or support another device to perform a process of acquiring the specific entity's public key from the blockchain network 200 by referring to the specific entity's DID. As another example, the blockchain node 210 may perform or support another device to perform a process of allowing the identity contract to acquire the specific entity's public key from the blockchain network 200 by referring to the specific entity's DID. And, the blockchain node 210 may perform or support another device to perform a process of verifying the confirmation information by decrypting the specific entity's signature value, included in the confirmation information, with the specific entity's public key, to thereby verify the request for the registration of the relational information. Herein, the confirmation information may be verified by determining whether the relational information acquired by decrypting the specific entity's signature value is identical to the relational information included in the confirmation information.

Meanwhile, as another example different from verifying the request for the registration of the relational information by the blockchain node 210 itself, the blockchain node 210 may perform or support another device to perform a process of transmitting the request for the registration of the relational information to the identity contract, to thereby allow the identity contract to verify the request for the registration of the relational information.

Thereafter, the blockchain node 210 may perform or support another device to perform one of (i) a process of registering the relational information in the blockchain network 200 as corresponding to the specific entity's DID and said another entity's DID if the request for the registration of the relational information is determined as verified by the blockchain node, at a step of S56, and (ii) a process of allowing the identity contract to register the relational information in the blockchain network 200 as corresponding to the specific entity's DID and said another entity's DID if the request for the registration of the relational information is determined as verified by the identity contract, at the step of S56.

On condition that the relational information on the relation between the specific entity's DID and said another entity's DID have been registered in the blockchain network 200 as above, in order to provide the specific entity with the service which is accessible with said another entity's DID, the request for the service may be transmitted to the service providing server 300 by using the specific entity's device 110 at a step of S57. Herein, the request for the service may include the specific entity's signature value created by encrypting the request for the service with the specific entity's private key corresponding to the specific entity's DID.

Then, the service providing server 300 may verify the request for the service, where the service is accessible with said another entity's DID, transmitted from the specific entity's device 110, at a step of S60.

As one example, the service providing server 300 may broadcast the request for the specific entity's public key corresponding to the specific entity's DID to the blockchain network 200 at a step of S58. Then, the blockchain node 210 may perform or support another device to perform (i) a process of acquiring the request for the specific entity's public key broadcast to the blockchain network 200, (ii) a process of acquiring the specific entity's public key, corresponding to the specific entity's DID, from the blockchain network 200 in response to the request for the specific entity's public key, and (iii) a process of transmitting the specific entity's public key, acquired from the blockchain network 200, to the service providing server 300 at a step of S59. As another example, the blockchain node 210 may perform or support another device to perform (i) a process of allowing the identity contract registered in the blockchain network 200 to acquire the specific entity's public key from the blockchain network 200 by referring to the specific entity's DID, and (ii) a process of transmitting the specific entity's public key to the service providing server 300 at the step of S59. And, the service providing server 300 may verify the request for the service by decrypting the specific entity's signature value, which is included in the request for the service, with the specific entity's public key transmitted from the blockchain node 210, at a step of S60. Herein, the request for the service may be verified by determining whether the request for the service acquired by decrypting the specific entity's signature value is identical to the request for the service transmitted from the specific entity's device.

Thereafter, if the request for the service is determined as verified, the service providing server 300 may broadcast the request for the relational information to the blockchain network 200 at a step of S61.

Herein, the request for the relational information may include the specific entity's DID or said another entity's DID.

And, the blockchain node 210 may perform or support another device to perform (i) a process of receiving the request for the relational information broadcast to the blockchain network 200, (ii) in response to the request for the relational information, one of (ii-1) a process of acquiring the relational information from the blockchain network 200 by referring to the specific entity's DID or said another entity's DID and (ii-2) a process of allowing the identity contract to acquire the relational information from the blockchain network 200 by referring to the specific entity's DID or said another entity's DID, and (iii) a process of transmitting the relational information to the service providing server 300 at a step of S62.

And, the service providing server 300 may confirm the relation between the specific entity's DID and said another entity's DID by referring to the relational information acquired from the blockchain node 210, at a step of S63.

Thereafter, if the relation between the specific entity's DID and said another entity's DID is confirmed by referring to the relational information, the service accessible with said another entity's DID may be provided to the specific entity's device 110 at a step of S64. As one example, if the relational information represents that "the specific entity's DID is the owner of said another entity's DID", and if the request for the service represents a log-on request using said another entity's DID, the service providing server 300 may confirm that the specific entity's DID is the owner of said another entity's DID by referring to the relational information, and may allow the specific entity's device 110 to log-on by using said another entity's DID.

FIG. 5 is a drawing schematically illustrating a method for providing the relational DID service in accordance with still yet another example embodiment of the present disclosure. The method for providing the relational DID service in accordance with still yet another example embodiment of the present disclosure is described by referring to FIG. 5 as follows. In the description below, the part easily deducible from the explanation of FIGS. 2 and 3 will be omitted.

In order to set the relation with the specific entity, said another entity may broadcast the setting information to the blockchain network 200 at a step of S71. Herein, the setting information may represent the relation between the specific entity and said another entity, where the relation may be set by using said another entity's device 120.

Herein, the setting information may include (1) the relational information representing the relation between the specific entity's DID and said another entity's DID, respectively corresponding to the specific entity and said another entity, and (2) said another entity's signature value created by encrypting the relational information with said another entity's private key corresponding to said another entity's DID. And the relational information may include information on relations among various entities, such as an IoT device and its owner, a parent and his/her child, an employee and his/her employer, a student and his/her professor, etc. As one example, the relational information may be set as representing that "the specific entity's DID is the owner of said another entity's DID".

Then, at least one blockchain node 210 in the blockchain network 200 may receive the setting information broadcast to the blockchain network 200, and may verify the received setting information at a step of S72.

As one example, the blockchain node 210 may perform or support another device to perform a process of acquiring said another entity's public key from the blockchain network 200 by referring to said another entity's DID. As another example, the blockchain node 210 may perform or support another device to perform a process of allowing the identity contract to acquire said another entity's public key from the blockchain network 200 by referring to said another entity's DID. And, the blockchain node 210 may perform or support another device to perform a process of verifying the setting information by decrypting said another entity's signature value, included in the setting information, with said another entity's public key. Herein, the setting information may be verified by determining whether the relational information acquired by decrypting said another entity's signature value is identical to the relational information included in the setting information. Meanwhile, as another example different from verifying the setting information by the blockchain node 210 itself, the blockchain node 210 may perform or support another device to perform a process of transmitting the setting information to the identity contract, to thereby allow the identity contract to verify the setting information.

Thereafter, if the setting information is determined as verified, the blockchain node 210 may perform or support another device to perform a process of transmitting the setting information, acquired from said another entity's device 120, to the specific entity's device 110 at a step of S73. Also, the blockchain node 210 may allow the identity contract to transmit a verification result on the setting information to said another entity's device 120, to thereby allow said another entity's device 120 to transmit the setting information to the specific entity's device 110.

And, the specific entity's device 110 may display the setting information, to thereby allow the specific entity to confirm the setting information, and if the specific entity confirms and approves the relational information between the specific entity's DID and said another entity's DID, then the specific entity's device 110 may broadcast the request for the registration of the relational information to the blockchain network 200 at a step of S74.

Herein, the request for the registration of the relational information may include (1) the setting information transmitted from said another entity's device 120 and (2) the confirmation information where the specific entity's device 110 may create the confirmation information by confirming the relational information between the specific entity's DID and said another entity's DID. And, the confirmation information may include (1) the relational information and (2) the specific entity's signature value created by encrypting the relational information with the specific entity's private key corresponding to the specific entity's DID. As another example, if the setting information transmitted from said another entity's device 120 is stored in the blockchain node 210, the confirmation information may be broadcast to the blockchain network 200 as the request for the registration of the relational information.

Then, the blockchain node 210 may perform or support another device to perform a process of receiving the request for the registration of the relational information where the request is broadcast to the blockchain network 200 by the specific entity's device 110, and a process of verifying the request for the registration of the relational information at a step of S75.

As one example, the blockchain node 210 may perform or support another device to perform a process of acquiring the specific entity's public key from the blockchain network 200 by referring to the specific entity's DID. As another example, the blockchain node 210 may perform or support another device to perform a process of allowing the identity contract to acquire the specific entity's public key from the blockchain network 200 by referring to the specific entity's DID. And, the blockchain node 210 may perform or support another device to perform a process of verifying the confirmation information by decrypting the specific entity's signature value, included in the confirmation information, with the specific entity's public key, to thereby verify the request for the registration of the relational information. Herein, the confirmation information may be verified by determining whether the relational information acquired by decrypting the specific entity's signature value is identical to the relational information included in the confirmation information.

Meanwhile, as another example different from verifying the request for the registration of the relational information by the blockchain node 210 itself, the blockchain node 210 may perform or support another device to perform a process of transmitting the request for the registration of the relational information to the identity contract, to thereby allow the identity contract to verify the request for the registration of the relational information.

Thereafter, the blockchain node 210 may perform or support another device to perform one of (i) a process of registering the relational information in the blockchain network 200 as corresponding to the specific entity's DID and said another entity's DID if the request for the registration of the relational information is determined as verified by the blockchain node, at a step of S76, and (ii) a process of allowing the identity contract to register the relational information in the blockchain network 200 as corresponding to the specific entity's DID and said another entity's DID if the request for the registration of the relational information is determined as verified by the identity contract, at the step of S76.

On condition that the relational information on the relation between the specific entity's DID and said another entity's DID have been registered in the blockchain network 200 as above, in order to provide the specific entity with the service which is accessible with said another entity's DID, the request for the service may be transmitted to the service providing server 300 by using the specific entity's device 110 at a step of S77. Herein, the request for the service may include the specific entity's signature value created by encrypting the request for the service with the specific entity's private key corresponding to the specific entity's DID.

Then, the service providing server 300 may verify the request for the service, where the service is accessible with said another entity's DID, transmitted from the specific entity's device 110, at a step of S82.

As one example, in order to acquire the specific entity's public key corresponding to the specific entity's DID, the specific entity's device 300 may transmit the request for the specific entity's DID document, corresponding to the specific entity's DID, to the resolving server 400, at a step of S78. And, in response to the request for the specific entity's DID document from the service providing server 300, the resolving server 400 may broadcast the request for the specific entity's public information to the blockchain network 200 at a step of S79. Herein, the specific entity's public information may be registered in the blockchain network 200 as corresponding to the specific entity's DID and may include the relational information and the specific entity's public key corresponding to the specific entity's DID. Then, in response to the request for the specific entity's public information, at least one blockchain node 210 in the blockchain network 200 may perform or support another device to perform (i) a process of acquiring the specific entity's public information, corresponding to the specific entity's DID, from the blockchain network 200, and (ii) a process of transmitting the specific entity's public information, acquired from the blockchain network 200, to the resolving server 400 at a step of S80. As another example, the blockchain node 210 may perform or support another device to perform (i) a process of allowing the identity contract registered in the blockchain network 200 to acquire the specific entity's public information from the blockchain network 200 by referring to the specific entity's DID, and (ii) a process of transmitting the specific entity's public information to the resolving server 400. And, the resolving server 400 may modify the specific entity's public information, transmitted from the blockchain node 210, into the specific entity's DID document, and may transmit the specific entity's DID document to the service providing server 300 at a step of S81. And, the service providing server 300 may acquire the specific entity's public key from the specific entity's DID document which is transmitted from the resolving server 400, and may verify the request for the service by decrypting the specific entity's signature value, which is included in the request for the service, with the specific entity's public key, at a step of S82. Herein, the request for the service may be verified by determining whether the request for the service acquired by decrypting the specific entity's signature value is identical to the request for the service transmitted from the specific entity's device 110.

Thereafter, if the request for the service is determined as verified, the service providing server 300 may transmit the request for the DID document to the resolving server 400 at a step of S83.

Herein, the request for the DID document may be at least one of the request for the specific entity's DID document and the request for said another entity's DID document.

Then, in response to the request for the DID document from the service providing server 300, the resolving server 400 may broadcast the request for the DID public information, corresponding to the request for the DID document, to the blockchain network 200 at a step of S84.

Herein, the DID public information may include at least one of the specific entity's public information and said another entity's public information. And, the specific entity's public information may be registered in the blockchain network 200 as corresponding to the specific entity's DID and may include the relational information and the specific entity's public key corresponding to the specific entity's DID. Also, said another entity's public information may be registered in the blockchain network 200 as corresponding to said another entity's DID and may include the relational information and said another entity's public key corresponding to said another entity's DID.

And, the blockchain node 210 may perform or support another device to perform (i) a process of receiving the request for the DID public information broadcast to the blockchain network 200, (ii) in response to the request for the DID public information, one of (ii-1) a process of acquiring the DID public information from the blockchain network 200 by referring to at least one of the specific entity's DID and said another entity's DID, and (ii-2) a process of allowing the identity contract to acquire the DID public information from the blockchain network 200 by referring to at least one of the specific entity's DID and said another entity's DID, and (iii) a process of transmitting the DID public information to the resolving server 400 at a step of S85.

Then, the resolving server 400 may modify the DID public information into the DID document, and may transmit the DID document to the service providing server 300 at a step of S86.

And, the service providing server 300 may confirm the relation between the specific entity's DID and said another entity's DID by referring to the relational information acquired from the DID document, at a step of S87.

Thereafter, if the relation between the specific entity's DID and said another entity's DID is confirmed by referring to the relational information, the service accessible with said another entity's DID may be provided to the specific entity's device 110 at a step of S88. As one example, if the relational information represents that "the specific entity's DID is the owner of said another entity's DID", and if the request for the service represents a log-on request using said another entity's DID, the service providing server 300 may confirm that the specific entity's DID is the owner of said another entity's DID by referring to the relational information, and may allow the specific entity's device 110 to log-on by using said another entity's DID.

The present disclosure has an effect of proving relations among the entities by registering the relations among the entities using the DIDs.

The present disclosure has another effect of providing various services by using the relations among the entities as a result of registering the relations among the entities using the DIDs.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a relational DID (decentralized identifier) service, comprising steps of:
   (a0)
      (i) a blockchain node in a blockchain network performing or supporting another device to perform processes of registering a specific entity's DID in the blockchain network and registering specific entity's public information corresponding to the specific entity's DID in the blockchain network in response to a request for registration of the specific entity's DID being broadcast from a specific entity's device to the blockchain network; and
      (ii) the blockchain node performing or supporting another device to perform processes of registering another entity's DID in the blockchain network and registering another entity's public information corresponding to said another entity's DID in the blockchain network in response to a request for registration of said another entity's DID being broadcast from another entity's device to the blockchain network, wherein the specific entity's DID of the specific entity and said another entity's DID of said another entity are different DIDs in the blockchain network;
(a) in response to a request for registration of relational information being broadcast from the specific entity's device to the blockchain network, wherein the relational information represents information on a relation between the specific entity's DID of a specific entity and said another entity's DID of another entity, wherein the relational information is selected from the group consisting of: the specific entity's DID of the specific entity being an owner of the another entity's DID of the another entity, an Internet of Things (IoT) device and its owner, a parent and a child, an employee and an employer, and a student and a professor, and wherein the relational information is set by said another entity and confirmed by the specific entity, the blockchain node performing or supporting another device to perform one of (i) a process of verifying the request for the registration of the relational information and (ii) a process of transmitting the request for the registration of the relational information to an identity contract registered in the blockchain network, to thereby allow the identity contract to verify the request for the registration of the relational information; and
(b) the blockchain node performing or supporting another device to perform one of (i) a process of registering the relational information in the blockchain network as corresponding to the specific entity's DID and said another entity's DID in response to the request for the registration of the relational information being determined as verified by the blockchain node, and (ii) a process of allowing the identity contract to register the relational information in the blockchain network as corresponding to the specific entity's DID and said another entity's DID in response to the request for the registration of the relational information being determined as verified by the identity contract,
wherein, at the step of (a), the request for the registration of the relational information includes setting information and confirmation information,
wherein another entity's device corresponding to said another entity's DID creates the setting information by setting a relation between the specific entity's DID and said another entity's DID, and
wherein the specific entity's device creates the confirmation information by confirming the relation between the specific entity's DID and said another entity's DID.

2. The method of claim 1, further comprising a step of:
(c) in response to a request for the relational information being acquired from a service providing server which received a request for a service transmitted from the specific entity's device,
  wherein the service is accessible with said another entity's DID or in response to a request for DID public information being acquired from a resolving server which received a request for a DID document from the service providing server,
  wherein the request for the DID document is at least one of a request for a specific entity's DID document and a request for another entity's DID document,
  wherein the DID public information includes at least one of specific entity's public information and another entity's public information,
  wherein the specific entity's public information is registered in the blockchain network as corresponding to the specific entity's DID and includes the relational information and a specific entity's public key corresponding to the specific entity's DID, and
  wherein said another entity's public information is registered in the blockchain network as corresponding to said another entity's DID and includes the relational information and another entity's public key corresponding to said another entity's DID, the blockchain node performing or supporting another device to perform
  (1) one of
    (i) in response to the request for the relational information from the service providing server,
      (i-1) a process of acquiring the relational information from the blockchain network by referring to the specific entity's DID or said another entity's DID or a process of allowing the identity contract to acquire the relational information from the blockchain network by referring to the specific entity's DID or said another entity's DID, and
      (i-2) a process of transmitting the relational information to the service providing server, and
    (ii) in response to the request for the DID public information from the resolving server,
      (ii-1) a process of acquiring the DID public information from the blockchain network by referring to at least one of the specific entity's DID and said another entity's DID or a process of allowing the identity contract to acquire the DID public information from the blockchain network by referring to at least one of the specific entity's DID and said another entity's DID, and
      (ii-2) a process of allowing the resolving server to modify the DID public information into the DID document and thus to transmit the DID document to the service providing server, and as a result,
  (2) a process of allowing the service providing server to
    (i) confirm a relation between the specific entity's DID and said another entity's DID by referring to one of the relational information acquired from the blockchain node and the relational information acquired from the DID document, and
    (ii) in response to the relation between the specific entity's DID and said another entity's DID being confirmed by using the relational information, provide the service corresponding to said another entity's DID to the specific entity's device.

3. The method of claim 2, wherein the request for the service transmitted from the specific entity's device includes a specific entity's signature value created by encrypting the request for the service with a specific entity's private key corresponding to the specific entity's DID, and wherein, in response to a request for the specific entity's public key corresponding to the specific entity's DID being acquired from the service providing server or in response to a request for the specific entity's public information being acquired from the resolving server which received the request for the specific entity's DID document from the service providing server, the blockchain node performs or supports another device to perform
  (1) one of
    (i) in response to the request for the specific entity's public key from the service providing server, (i-1) a process of acquiring the specific entity's public key corresponding to the specific entity's DID from the blockchain network by referring to the specific entity's DID or a process of allowing the identity contract to acquire the specific entity's public key from the blockchain network by referring to the specific entity's DID, and (i-2) a process of transmitting the specific entity's public key to the service providing server and (ii) in response to the request for the specific entity's public information from the resolving server, (ii-1) a process of acquiring the specific entity's public information from the blockchain network by referring to the specific entity's DID or a process of allowing the identity contract to acquire the specific entity's public information from the blockchain network by referring to the specific entity's DID, and (ii-2) a process of allowing the resolving server to modify the specific entity's public information into the specific entity's DID document and thus to transmit the specific entity's DID document to the service providing server, and as a result, (2) a process of allowing the service providing server to (i) verify the specific entity's signature value by decrypting the specific entity's signature value with the specific entity's public key acquired from the blockchain node or from the specific entity's DID document, and (ii) in response to the specific entity's signature value being determined as verified, broadcast the request for the relational information to the blockchain network.

4. The method of claim 1, wherein the setting information includes (1) the relational information representing a relation between the specific entity's DID and said another entity's DID, and (2) another entity's signature value created by encrypting the relational information with another entity's private key corresponding to said another entity's DID, and wherein the confirmation information includes (1) the relational information and (2) a specific entity's signature value created by encrypting the relational information with a specific entity's private key corresponding to the specific entity's DID, and wherein the blockchain node performs or supports another device to perform (i)

(i-1) a process of acquiring a specific entity's public key corresponding to the specific entity's DID and another entity's public key corresponding to said another entity's DID from the blockchain network by referring to the specific entity's DID and said another entity's DID or (i-2) a process of allowing the identity contract to acquire the specific entity's public key and said another entity's public key from the blockchain network by referring to the specific entity's DID and said another entity's DID, (ii) a process of verifying the setting information by decrypting said another entity's signature value with said another entity's public key, and (iii) a process of verifying the confirmation information by decrypting the specific entity's signature value with the specific entity's public key, to thereby verify the request for the registration of the relational information.

5. The method of claim 4, wherein, in response to a request for said another entity's public key being acquired from the specific entity's device which received the setting information transmitted from said another entity's device wherein said another entity's public key corresponds to said another entity's DID or in response to a request for another entity's public information being acquired from a resolving server which received a request for another entity's DID document from the specific entity's device wherein said another entity's public information is registered in the blockchain network as corresponding to said another entity's DID and includes the relational information and another entity's public key corresponding to said another entity's DID, the blockchain node performs or supports another device to perform (1) one of (i) in response to the request for said another entity's public key from the specific entity's device, (i-1) a process of acquiring said another entity's public key from the blockchain network by referring to said another entity's DID or a process of allowing the identity contract to acquire said another entity's public key from the blockchain network by referring to said another entity's DID, and (i-2) a process of transmitting said another entity's public key to the specific entity's device, and (ii) in response to the request for said another entity's public information from the resolving server, (ii-1) a process of acquiring another entity's public information from the blockchain network by referring to said another entity's DID or a process of allowing the identity contract to acquire said another entity's public information from the blockchain network by referring to said another entity's DID, and (ii-2) a process of allowing the resolving server to modify said another entity's public information into said another entity's DID document and thus to transmit said another entity's DID document to the specific entity's device, and as a result, (2) a process of allowing the specific entity's device to (i) verify the setting information by decrypting said another entity's signature value with said another entity's public key acquired from the blockchain node or from said another entity's DID document, and (ii) in response to the setting information being determined as verified, broadcast the request for the registration of the relational information to the blockchain network.

6. The method of claim 4, wherein, in response to the setting information broadcast from said another entity's device to the blockchain network being acquired, the blockchain node performs or supports another device to perform a process of transmitting the setting information to the specific entity's device or a process of allowing the identity contract to transmit the setting information to the specific entity's device, to thereby allow the specific entity's device to broadcast the request for the registration of the relational information to the blockchain network in response to a verification result on the setting information which is verified by the specific entity's device and thus acquire the request for the registration of the relational information.

7. The method of claim 1, wherein, in response to the setting information being broadcast from said another entity's device to the blockchain network, the blockchain node performs or supports another device to perform
  (i) a process of acquiring another entity's public key from the blockchain network by referring to said another entity's DID or a process of allowing the identity contract to acquire said another entity's public key from the blockchain network by referring to said another entity's DID,
  (ii) a process of verifying the setting information by decrypting said another entity's signature value with said another entity's public key, and
  (iii) in response to the setting information being determined as verified, a process of transmitting the setting information to the specific entity's device or a process of allowing the identity contract to transmit a verification result on the setting information to said another entity's device and thus to allow said another entity's device to transmit the setting information to the specific entity's device, and
wherein, in response to the confirmation information being broadcast from the specific entity's device to the blockchain network, the blockchain node performs or supports another device to perform
  (i) a process of acquiring a specific entity's public key from the blockchain network by referring to the specific entity's DID, or a process of allowing the identity contract to acquire the specific entity's public key from the blockchain network by referring to the specific entity's DID, and
  (ii) a process of verifying the confirmation information by decrypting the specific entity's signature value with the specific entity's public key.

8. A blockchain node in a blockchain network for providing a relational (decentralized identifier) service, comprising:
  at least one memory that stores instructions; and
  at least one processor configured to execute the instructions to perform or support another device to perform:
    (I0)
      (i) processes of registering a specific entity's DID in the blockchain network and registering specific entity's public information corresponding to the specific entity's DID in the blockchain network in response to a request for registration of the specific entity's DID being broadcast from a specific entity's device to the blockchain network; and
      (ii) processes of registering another entity's DID in the blockchain network and registering another entity's public information corresponding to said another entity's DID in the blockchain network in response to a request for registration of said another entity's DID being broadcast from another entity's device to the blockchain network, wherein the specific entity's DID of the specific entity and said another entity's DID of said another entity are different DIDs in the blockchain network;
    (I) in response to a request for registration of relational information being broadcast from the specific entity's device to the blockchain network, wherein the relational information represents information on a relation between the specific entity's DID of a specific entity and said another entity's DID of another entity, wherein the relational information is selected from the group consisting of: the specific entity's DID of the specific entity being an owner of the another entity's DID of the another entity, an Internet of Things (IoT) device and its owner, a parent and a child, an employee and an employer, and a student and a professor, and wherein the relational information is set by said another entity and confirmed by the specific entity, one of
      (i) a process of verifying the request for the registration of the relational information and
      (ii) a process of transmitting the request for the registration of the relational information to an identity contract registered in the blockchain network, to thereby allow the identity contract to verify the request for the registration of the relational information, and
    (II) one of
      (i) a process of registering the relational information in the blockchain network as corresponding to the specific entity's DID and said another entity's DID in response to the request for the registration of the relational information being determined as verified by the blockchain node, and
      (ii) a process of allowing the identity contract to register the relational information in the blockchain network as corresponding to the specific entity's DID and said another entity's DID in response to the request for the registration of the relational information being determined as verified by the identity contract,
  wherein, at the process of (I), the request for the registration of the relational information includes setting information and confirmation information,
  wherein another entity's device corresponding to said another entity's DID creates the setting information by setting a relation between the specific entity's DID and said another entity's DID, and
  wherein the specific entity's device creates the confirmation information by confirming the relation between the specific entity's DID and said another entity's DID.

9. The blockchain node of claim 8, wherein the processor further performs or supports another device to perform:
  (III) in response to a request for the relational information being acquired from a service providing server which received a request for a service transmitted from the specific entity's device wherein the service is accessible with said another entity's DID or in response to a request for DID public information being acquired from a resolving server which received a request for a DID document from the service providing server, wherein the request for the DID document is at least one of a request for a specific entity's DID document and a request for another entity's DID document, wherein the DID public information includes at least one of specific entity's public information and another entity's public information, wherein the specific entity's public information is registered in the blockchain network as corresponding to the specific entity's DID and includes the relational information and a specific entity's public key corresponding to the specific entity's DID, and wherein said another entity's public information is registered in the blockchain network as corresponding to said another entity's DID and includes the relational information and another entity's public key corresponding to said another entity's DID,
    (1) one of
      (i) in response to the request for the relational information from the service providing server,
        (i-1) a process of acquiring the relational information from the blockchain network by referring to the specific entity's DID or said another entity's DID or a process of allowing the identity contract to acquire the relational information from the blockchain network by referring to the specific entity's DID or said another entity's DID, and
- (i-2) a process of transmitting the relational information to the service providing server, and
- (ii) in response to the request for the DID public information from the resolving server,
  - (ii-1) a process of acquiring the DID public information from the blockchain network by referring to at least one of the specific entity's DID and said another entity's DID or a process of allowing the identity contract to acquire the DID public information from the blockchain network by referring to at least one of the specific entity's DID and said another entity's DID, and
  - (ii-2) a process of allowing the resolving server to modify the DID public information into the DID document and thus to transmit the DID document to the service providing server, and as a result,
- (2) a process of allowing the service providing server to
  - (i) confirm a relation between the specific entity's DID and said another entity's DID by referring to one of the relational information acquired from the blockchain node and the relational information acquired from the DID document, and
  - (ii) in response to the relation between the specific entity's DID and said another entity's DID being confirmed by using the relational information, provide the service corresponding to said another entity's DID to the specific entity's device.

10. The blockchain node of claim 9,
wherein the request for the service transmitted from the specific entity's device includes a specific entity's signature value created by encrypting the request for the service with a specific entity's private key corresponding to the specific entity's DID, and
wherein, in response to a request for the specific entity's public key corresponding to the specific entity's DID being acquired from the service providing server or in response to a request for the specific entity's public information being acquired from the resolving server which received the request for the specific entity's DID document from the service providing server, the processor performs or supports another device to perform
- (1) one of
  - (i) in response to the request for the specific entity's public key from the service providing server,
    - (i-1) a process of acquiring the specific entity's public key corresponding to the specific entity's DID from the blockchain network by referring to the specific entity's DID or a process of allowing the identity contract to acquire the specific entity's public key from the blockchain network by referring to the specific entity's DID, and
    - (i-2) a process of transmitting the specific entity's public key to the service providing server and
  - (ii) in response to the request for the specific entity's public information from the resolving server,
    - (ii-1) a process of acquiring the specific entity's public information from the blockchain network by referring to the specific entity's DID or a process of allowing the identity contract to acquire the specific entity's public information from the blockchain network by referring to the specific entity's DID, and
    - (ii-2) a process of allowing the resolving server to modify the specific entity's public information into the specific entity's DID document and thus to transmit the specific entity's DID document to the service providing server, and as a result,
- (2) a process of allowing the service providing server to
  - (i) verify the specific entity's signature value by decrypting the specific entity's signature value with the specific entity's public key acquired from the blockchain node or from the specific entity's DID document, and
  - (ii) in response to the specific entity's signature value being determined as verified, broadcast the request for the relational information to the blockchain network.

11. The blockchain node of claim 8,
wherein the setting information includes
- (1) the relational information representing a relation between the specific entity's DID and said another entity's DID, and
- (2) another entity's signature value created by encrypting the relational information with another entity's private key corresponding to said another entity's DID, and wherein the confirmation information includes (1) the relational information and (2) a specific entity's signature value created by encrypting the relational information with a specific entity's private key corresponding to the specific entity's DID, and
wherein the processor performs or supports another device to perform
- (i)
  - (i-1) a process of acquiring a specific entity's public key corresponding to the specific entity's DID and another entity's public key corresponding to said another entity's DID from the blockchain network by referring to the specific entity's DID and said another entity's DID or
  - (i-2) a process of allowing the identity contract to acquire the specific entity's public key and said another entity's public key from the blockchain network by referring to the specific entity's DID and said another entity's DID,
- (ii) a process of verifying the setting information by decrypting said another entity's signature value with said another entity's public key, and
- (iii) a process of verifying the confirmation information by decrypting the specific entity's signature value with the specific entity's public key, to thereby verify the request for the registration of the relational information.

12. The blockchain node of claim 11,
wherein, in response to a request for said another entity's public key being acquired from the specific entity's device which received the setting information transmitted from said another entity's device
wherein said another entity's public key corresponds to said another entity's DID or in response to a request for another entity's public information being acquired from a resolving server which received a request for another entity's DID document from the specific entity's device
wherein said another entity's public information is registered in the blockchain network as corresponding to said another entity's DID and includes the relational information and another entity's public key corresponding to said another entity's DID, the processor performs or supports another device to perform
(1) one of
(i) in response to the request for said another entity's public key from the specific entity's device,
(i-1) a process of acquiring said another entity's public key from the blockchain network by referring to said another entity's DID or a process of allowing the identity contract to acquire said another entity's public key from the blockchain network by referring to said another entity's DID, and
(i-2) a process of transmitting said another entity's public key to the specific entity's device, and
(ii) in response to the request for said another entity's public information from the resolving server,
(ii-1) a process of acquiring another entity's public information from the blockchain network by referring to said another entity's DID or a process of allowing the identity contract to acquire said another entity's public information from the blockchain network by referring to said another entity's DID, and
(ii-2) a process of allowing the resolving server to modify said another entity's public information into said another entity's DID document and thus to transmit said another entity's DID document to the specific entity's device, and as a result,
(2) a process of allowing the specific entity's device to
(i) verify the setting information by decrypting said another entity's signature value with said another entity's public key acquired from the blockchain node or from said another entity's DID document, and
(ii) in response to the setting information being determined as verified, broadcast the request for the registration of the relational information to the blockchain network.

13. The blockchain node of claim 11, wherein, in response to the setting information broadcast from said another entity's device to the blockchain network being acquired, the processor performs or supports another device to perform a process of transmitting the setting information to the specific entity's device or a process of allowing the identity contract to transmit the setting information to the specific entity's device, to thereby allow the specific entity's device to broadcast the request for the registration of the relational information to the blockchain network in response to a verification result on the setting information which is verified by the specific entity's device and thus acquire the request for the registration of the relational information.

14. The blockchain node of claim 8,
wherein, in response to the setting information being broadcast from said another entity's device to the blockchain network, the processor performs or supports another device to perform
(i) a process of acquiring another entity's public key from the blockchain network by referring to said another entity's DID or a process of allowing the identity contract to acquire said another entity's public key from the blockchain network by referring to said another entity's DID,
(ii) a process of verifying the setting information by decrypting said another entity's signature value with said another entity's public key, and
(iii) in response to the setting information being determined as verified, a process of transmitting the setting information to the specific entity's device or a process of allowing the identity contract to transmit a verification result on the setting information to said another entity's device and thus to allow said another entity's device to transmit the setting information to the specific entity's device, and
wherein, in response to the confirmation information being broadcast from the specific entity's device to the blockchain network, the processor performs or supports another device to perform
(i) a process of acquiring a specific entity's public key from the blockchain network by referring to the specific entity's DID, or a process of allowing the identity contract to acquire the specific entity's public key from the blockchain network by referring to the specific entity's DID, and
(ii) a process of verifying the confirmation information by decrypting the specific entity's signature value with the specific entity's public key.

* * * * *